United States Patent
Dziak et al.

(10) Patent No.: US 9,553,739 B1
(45) Date of Patent: Jan. 24, 2017

(54) LOOP ADAPTATION CONTROL WITH PATTERN DETECTION

(71) Applicant: Avago Technologies General IP (Singapore) Pte. Ltd., Singapore (SG)

(72) Inventors: Scott Dziak, Ft. Collins, CO (US); Haitao Xia, San Jose, CA (US); Lu Lu, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/788,765

(22) Filed: Jun. 30, 2015

(51) Int. Cl.
*H04L 25/03* (2006.01)

(52) U.S. Cl.
CPC .............................. *H04L 25/03019* (2013.01)

(58) Field of Classification Search
CPC ..................... H04L 25/03057; H04L 25/03019
See application file for complete search history.

(56) References Cited

U.S. PATENT DOCUMENTS

| | | | | |
|---|---|---|---|---|
| 5,771,127 A | * | 6/1998 | Reed | G11B 20/10009 360/40 |
| 6,249,398 B1 | * | 6/2001 | Fisher | G11B 5/09 360/46 |
| 7,254,198 B1 | * | 8/2007 | Manickam | H04L 25/03057 375/233 |
| 7,525,746 B1 | | 4/2009 | Oberg | |
| 7,894,151 B2 | | 2/2011 | Bliss | |
| 8,111,792 B2 | | 2/2012 | Ou | |
| 8,139,457 B2 | | 3/2012 | Cao | |
| 2004/0076245 A1 | * | 4/2004 | Okamoto | G11B 20/10009 375/341 |
| 2009/0097538 A1 | | 4/2009 | Aziz et al. | |

\* cited by examiner

*Primary Examiner* — Kenneth Lam

(57) ABSTRACT

An apparatus for controlling a feedback loop includes a digital finite impulse response filter configured to equalize digital samples to yield equalized data, a data detector circuit configured to detect values of the equalized data to yield detected data, a pattern detection circuit configured to detect at least one pattern in the detected data, an expected value comparison circuit configured to compare the digital samples corresponding to the at least one pattern with an expected value, and a feedback loop adaptation circuit configured to control a feedback loop based in part on whether the at least one pattern is detected by the pattern detection circuit and on an output of the expected value comparison circuit.

19 Claims, 6 Drawing Sheets

LOOP ADAPTATION CONTROL WITH PATTERN DETECTION

FIELD OF THE INVENTION

Various embodiments of the present invention provide systems and methods for data processing, and more particularly systems and methods for control of loop adaptation with pattern detection.

BACKGROUND

Various data processing systems have been developed including storage systems, cellular telephone systems, and radio transmission systems. In such systems data is transferred from a sender to a receiver via some medium. For example, in a storage system, data is sent from a sender (i.e., a write function) to a receiver (i.e., a read function) via a storage medium. As information is stored and transmitted in the form of digital data, errors are introduced that, if not corrected, can corrupt the data and render the information unusable. The effectiveness of any transfer is impacted by any losses in data caused by various factors. For example, as the recording density of magnetic disk drives increases, the noise, jitter and distortion increases, making it more difficult to recover the original data. Feedback loop adaptation can facilitate recovery of original data, however, adapting a feedback loop based on erroneous data can cause divergence in feedback loop elements being adapted.

BRIEF SUMMARY

Some embodiments of the present invention provide an apparatus for controlling a feedback loop including a digital finite impulse response filter configured to equalize digital samples to yield equalized data, a data detector circuit configured to detect values of the equalized data to yield detected data, a pattern detection circuit configured to detect at least one pattern in the detected data, an expected value comparison circuit configured to compare the digital samples corresponding to the at least one pattern with an expected value, and a feedback loop adaptation circuit configured to control a feedback loop based in part on whether the at least one pattern is detected by the pattern detection circuit and on an output of the expected value comparison circuit.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention. Additional embodiments are disclosed in the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals may be used throughout several drawings to refer to similar components.

DETAILED DESCRIPTION OF THE INVENTION

Various embodiments of the present invention provide systems and methods for controlling loop adaptation with pattern detection.

In some embodiments, a data processing system includes a digital finite impulse response (DFIR) filter used to equalize digital data samples and a data detector used to detect values in the equalized samples, with the DFIR having tap coefficients that are adapted based on the detected values. Adaptation of the DFIR tap coefficients is disabled for potentially problematic patterns in the data. If a potentially problematic pattern is identified in the detected values, such as, but not limited to, a Nyquist pattern, the value of the digital data samples corresponding to the pattern is examined to determine whether the sample values are close to the expected values. If not, adaptation of the DFIR tap coefficients is disabled.

In some embodiments, a data processing system includes a DC loop used to reduce a DC offset or bias in an input signal, either removing the DC offset from DC samples or from an analog signal. A DFIR in the system equalizes digital samples representing the input signal, and a data detector is used to detect values in the equalized samples. Adaptation of the DC loop is disabled for potentially problematic patterns in the data. If a potentially problematic pattern is identified in the detected values, such as, but not limited to, a Nyquist pattern, the value of the digital data samples corresponding to the pattern is examined to determine whether the sample values are close to the expected values. If not, adaptation of the DC loop is disabled.

Thus, loop adaptation is disabled or skipped for certain patterns, when the data samples corresponding to the pattern have poor quality.

Figure 1:
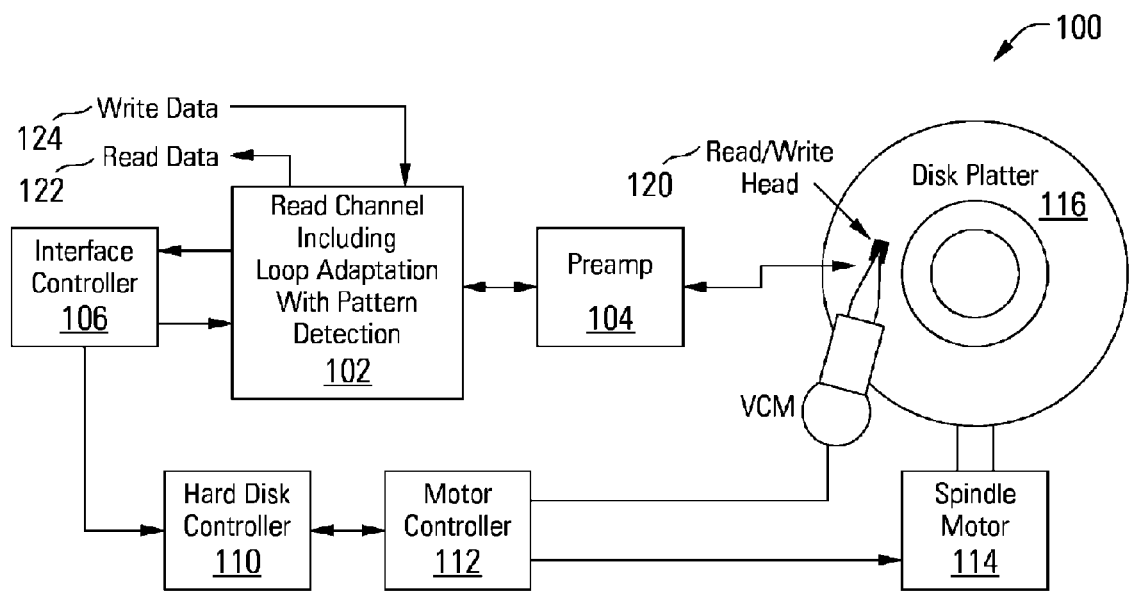
FIG. 1 depicts storage system including loop adaptation control with pattern detection in accordance with some embodiments of the present invention.

Loop adaptation control with pattern detection can be applied to data from any source. Although the loop processing with variance adaptation disclosed herein is not limited to any particular application, several examples of applications are presented in FIGS. 1 and 2 that benefit from embodiments of the present invention. Turning to FIG. 1, a storage system 100 is depicted as an example application of loop adaptation control with pattern detection in accordance with some embodiments of the present invention. The storage system 100 includes a read channel circuit 102 with a feedback loop with adaptation control based in part on pattern detection in accordance with some embodiments of the present inventions. Loop adaptation is disabled for detected data patterns for which the digital samples are of low quality. Storage system 100 may be, for example, a hard disk drive. Storage system 100 also includes a preamplifier 104, an interface controller 106, a hard disk controller 110, a motor controller 112, a spindle motor 114, a disk platter 116, and a read/write head assembly 120. Interface controller 106 controls addressing and timing of data to/from disk platter 116. The data on disk platter 116 consists of groups of magnetic signals that may be detected by read/write head assembly 120 when the assembly is properly positioned over disk platter 116. In one embodiment, disk platter 116 includes magnetic signals recorded in accordance with either a longitudinal or a perpendicular recording scheme.

In a typical read operation, read/write head assembly 120 is accurately positioned by motor controller 112 over a desired data track on disk platter 116. Motor controller 112 both positions read/write head assembly 120 in relation to disk platter 116 and drives spindle motor 114 by moving read/write head assembly 120 to the proper data track on disk platter 116 under the direction of hard disk controller 110. Spindle motor 114 spins disk platter 116 at a determined spin rate (RPMs). Once read/write head assembly 120 is positioned adjacent the proper data track, magnetic signals representing data on disk platter 116 are sensed by read/write head assembly 120 as disk platter 116 is rotated by spindle motor 114. The sensed magnetic signals are provided as a continuous, minute analog signal representative of the magnetic data on disk platter 116. This minute analog signal is transferred from read/write head assembly 120 to read channel circuit 102 via preamplifier 104. Preamplifier 104 is operable to amplify the minute analog signals accessed from disk platter 116. In turn, read channel circuit 102 digitizes and decodes the received analog signal to recreate the information originally written to disk platter 116. This data is provided as read data 122 to a receiving circuit.

While processing the received analog signal, one or more feedback loops can be applied in the read channel circuit 102, for example to cancel DC offsets either in the analog signal or the corresponding digital samples, or to adapt tap coefficients of a DFIR used to equalize digital samples. The adaptation of feedback loops is disabled for particular data pattern(s) when the quality of the digital samples corresponding to the data pattern(s) is low. The quality of samples is determined in some embodiments by comparing the samples from an analog to digital converter with a threshold or range that distinguishes samples with values close to expected from other samples, referred to herein as low quality samples, with values that are not close to expected values based on the threshold, range or other criterion.

Figure 3:
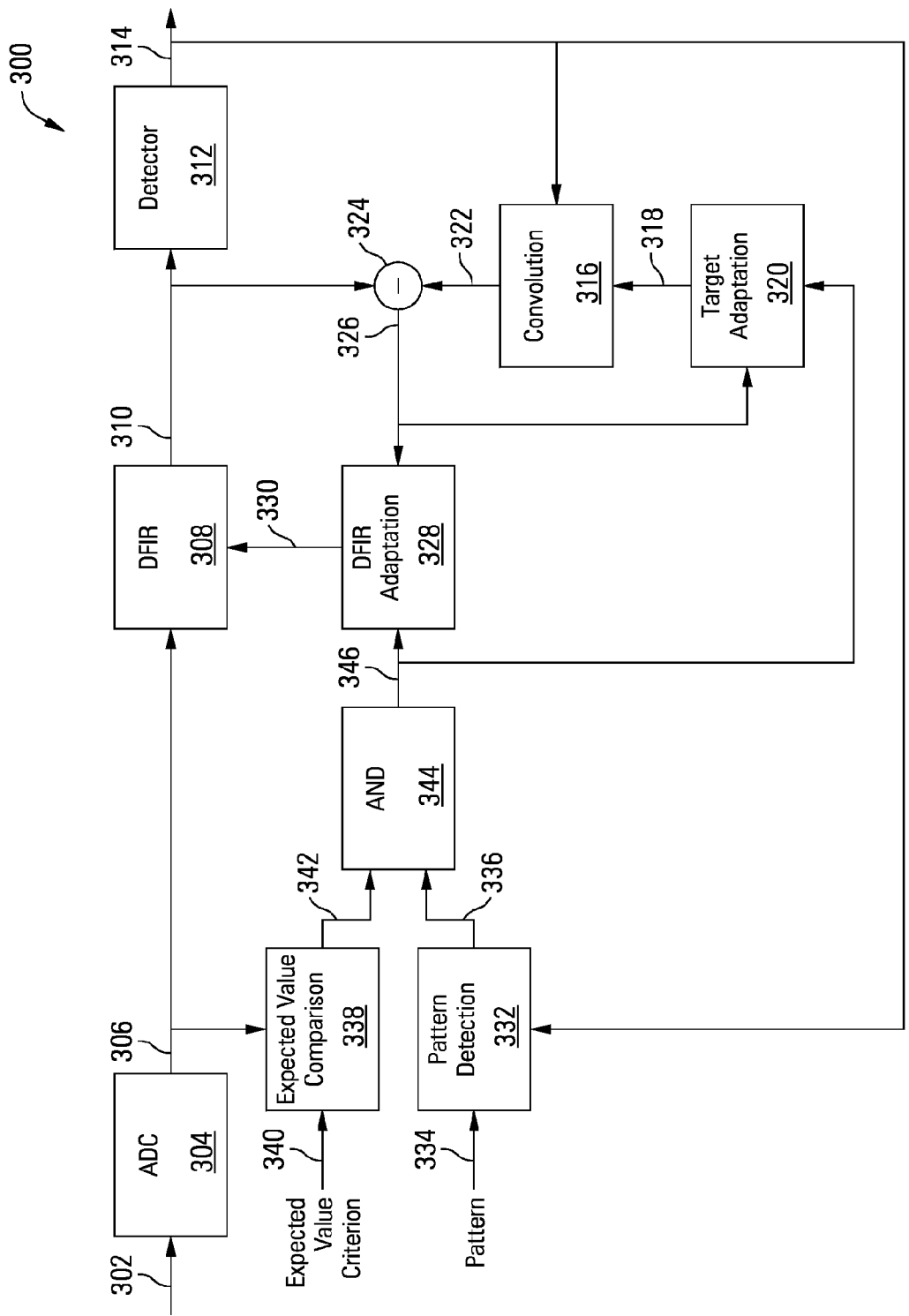
FIG. 3 depicts digital finite impulse response filter adaptation control with pattern detection for a single data source in accordance with some embodiments of the present invention.
Figure 4:
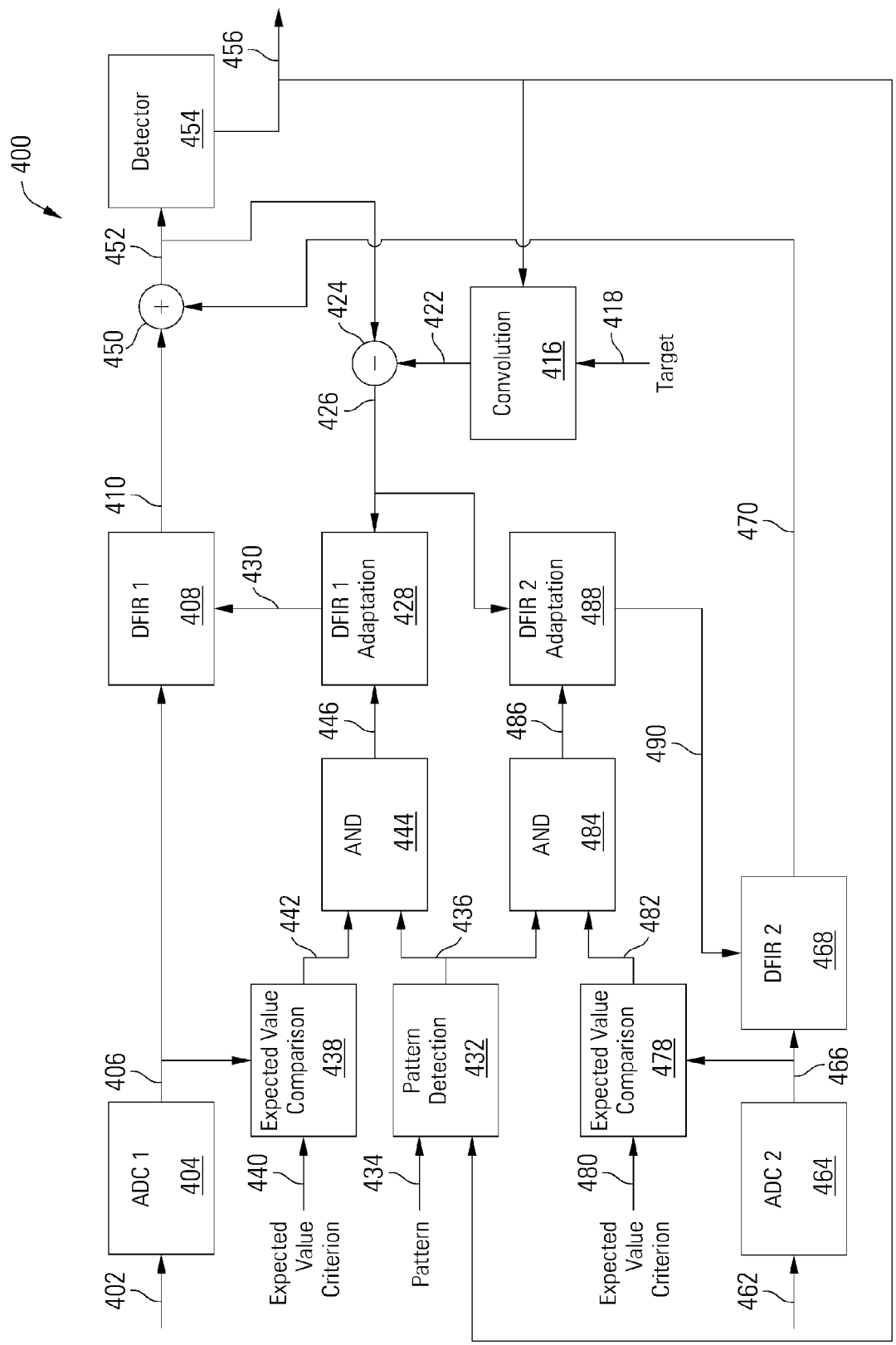
FIG. 4 depicts digital finite impulse response filter adaptation control with pattern detection for multiple data sources in accordance with some embodiments of the present invention.
Figure 5:
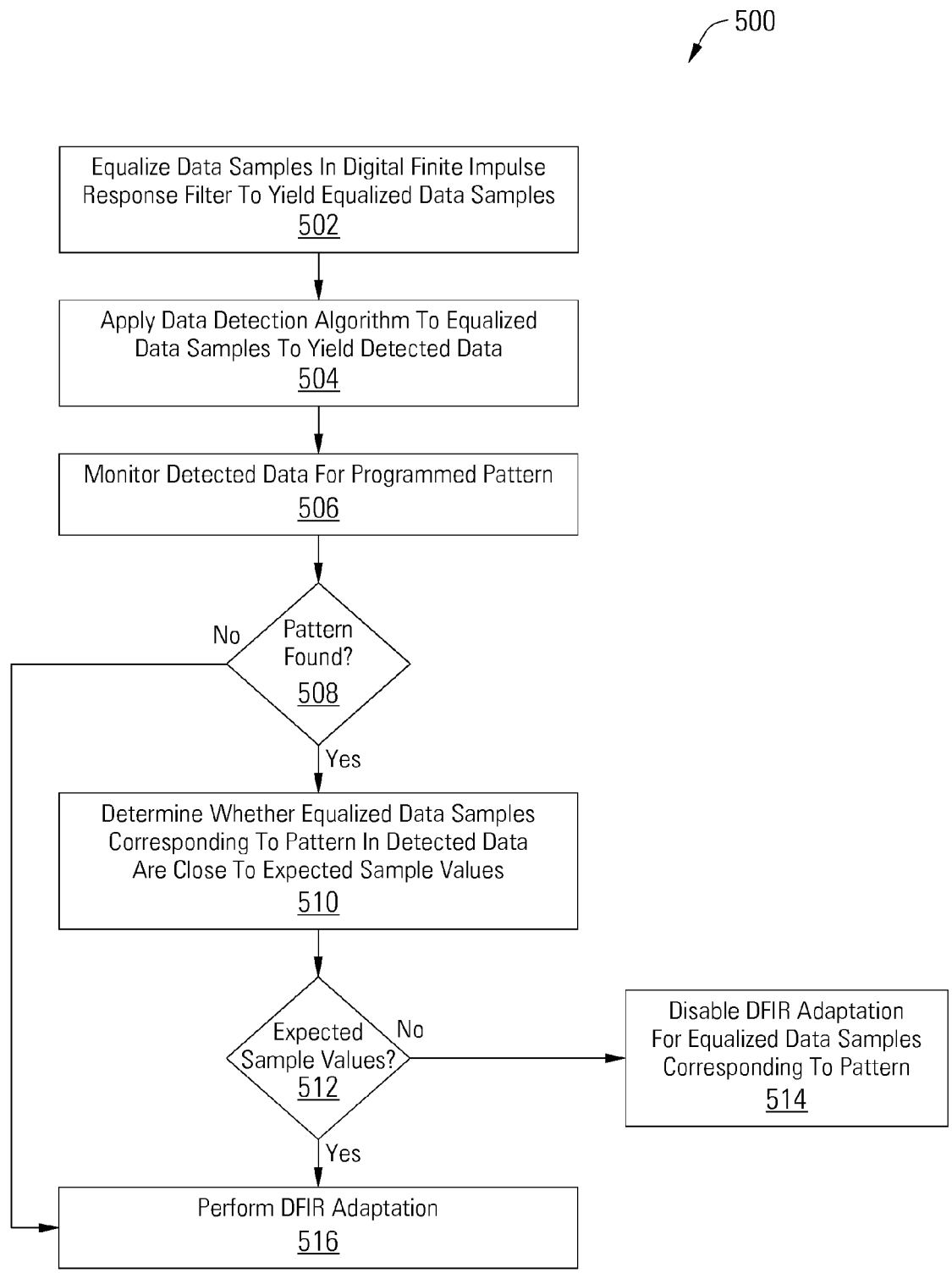
FIG. 5 depicts a flow diagram showing a method for controlling adaptation of a digital finite impulse response filter with pattern detection in accordance with some embodiments of the present invention.
Figure 6:
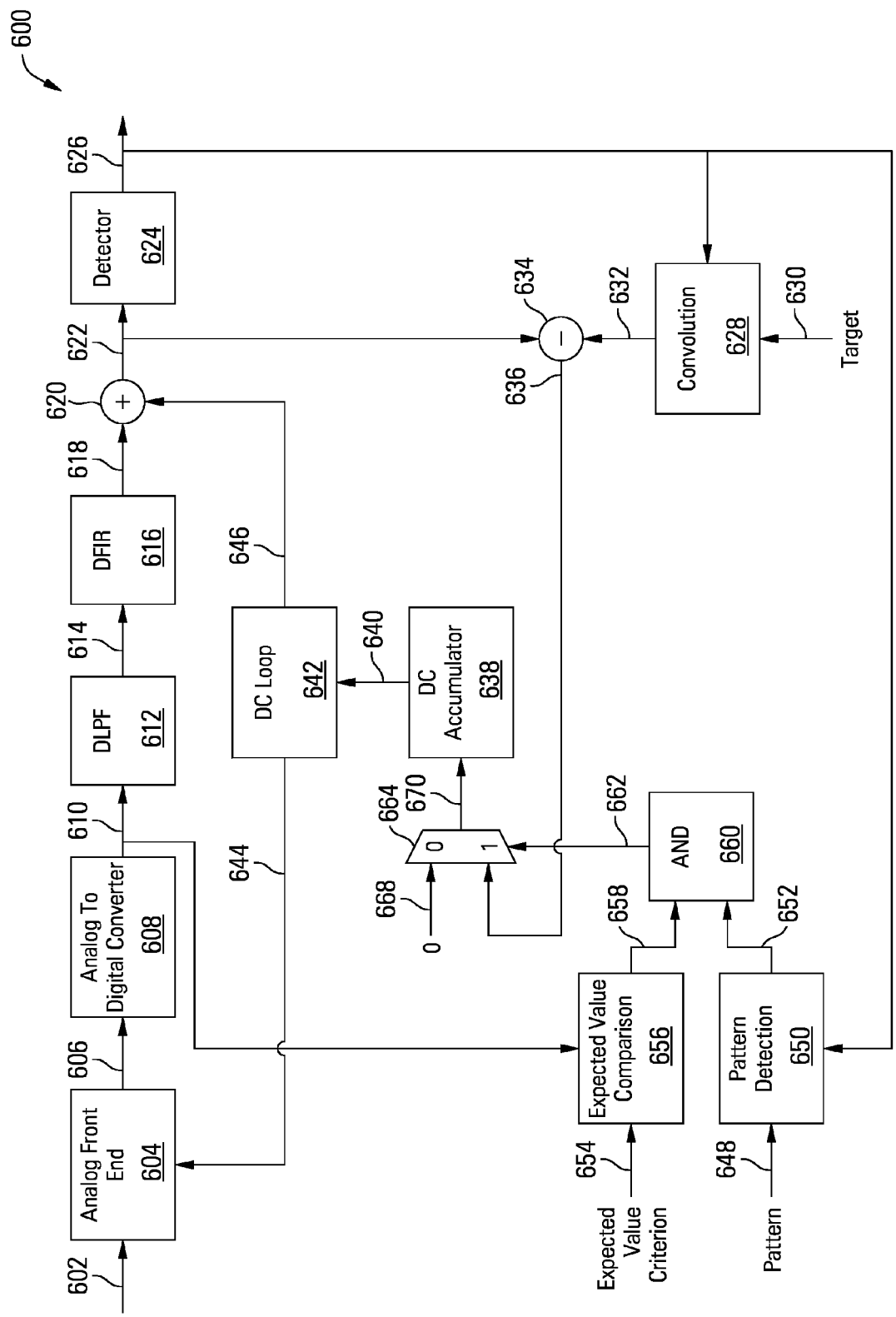
FIG. 6 depicts DC loop adaptation control with pattern detection in accordance with some embodiments of the present invention.

Such control of loop adaptation with pattern detection can be implemented consistent with that disclosed in relation to FIGS. 3-4 and 6. In some cases, the loop adaptation control can be performed consistent with the methods disclosed in relation to FIGS. 5 and 7.

A write operation is substantially the opposite of the preceding read operation with write data 124 being provided to read channel circuit 102. This data is then encoded and written to disk platter 116.

It should be noted that storage system 100 can be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that storage system 100 may be modified to include solid state memory that is used to store data in addition to the storage offered by disk platter 116. This solid state memory may be used in parallel to disk platter 116 to provide additional storage. In such a case, the solid state memory receives and provides information directly to read channel circuit 102. Alternatively, the solid state memory may be used as a cache where it offers faster access time than that offered by disk platted 116. In such a case, the solid state memory may be disposed between interface controller 106 and read channel circuit 102 where it operates as a pass through to disk platter 116 when requested data is not available in the solid state memory or when the solid state memory does not have sufficient storage to hold a newly written data set. Based upon the disclosure provided herein, one of ordinary skill in the art will recognize a variety of storage systems including both disk platter 116 and a solid state memory.

Figure 2:
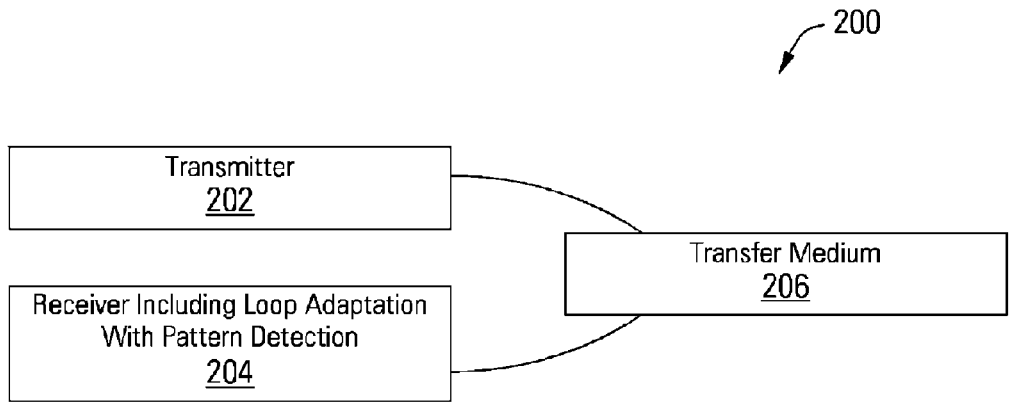
FIG. 2 depicts a wireless communication system including loop adaptation control with pattern detection in accordance with some embodiments of the present invention.

Turning to FIG. 2, a wireless communication system 200 or data transmission device including a receiver 204 with loop adaptation with pattern detection is shown in accordance with some embodiments of the present inventions. Communication system 200 includes a transmitter 202 that is operable to transmit encoded information via a transfer medium 206 as is known in the art. The encoded data is received from transfer medium 206 by receiver 204. Receiver 204 incorporates a feedback loop with adaptation control based on pattern detection. Such loop adaptation control can be implemented consistent with that disclosed in relation to FIGS. 3-4 and 6. In some cases, the loop adaptation control can be performed consistent with the methods disclosed in relation to FIGS. 5 and 7.

Turning now to FIG. 3, an analog input signal 302 is received by a data processing circuit 300. In some cases, analog input signal 302 is derived from a read/write head assembly that is disposed in relation to a storage medium. In other cases, analog input signal 302 is derived from a receiver circuit that is operable to receive a signal from a transmission medium. The transmission medium may be wired or wireless. Based upon the disclosure provided herein, one of ordinary skill in the art will recognize a variety of sources from which analog input signal 302 may be derived. The analog input signal 302 may have been processed in any suitable manner, for example by amplifying and/or filtering in a preamplifier and/or analog front end before being received by the data processing circuit 300 of FIG. 3.

The analog input signal 302 is sampled by an analog to digital converter 304, yielding data samples 306. Analog to digital converter 304 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present inventions. Data samples 306 are provided to digital finite impulse response (DFIR) filter 308 which applies an equalization algorithm to data samples 306, yielding equalized samples 310. The DFIR 308 equalizes data samples 306 as configured by filter tap coefficients 330, generated by a DFIR adaptation circuit 328. The DFIR adaptation circuit 328 tailors the equalization applied by the DFIR 308 to the actual input data and signal to noise ratio conditions.

The equalized samples 310 are provided to a data detector 312, which applies an algorithm to equalized samples 310 such as, but not limited to, a maximum likelihood algorithm to detect the original values of the data before storage or transmission, amplification and filtering, sampling and equalization. In some embodiments, the data detection algorithm can be but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention. Data detector 312 provides detected data 314, also referred to as hard decisions or non-return to zero (NRZ) data indicating the original input values as determined by the detector. Detected data 314 can be further processed or used in any suitable manner. In some embodiments, the detector 312 is a loop detector with relatively low latency performance, used to adjust and control feedback loops controlling analog filtering, DC offset cancellation, equalization, and/or other processes before the data values are further detected and decoded.

The DFIR adaptation circuit 328 can adapt the filter tap coefficients 330 for the DFIR 308 in any suitable manner. Based upon the disclosure provided herein, one of ordinary skill in the art will recognize a variety of DFIR adaptation algorithms and processes that may be used in relation to different embodiments of the present invention. In some embodiments, the DFIR adaptation circuit 328 adapts the filter tap coefficients 330 for the DFIR 308 based on an error signal 326, generated by subtracting Y ideal samples 322 from the equalized samples 310 or Y samples in subtraction circuit 324. Y ideal samples 322 can be generated in any suitable manner, such as, but not limited to, by convolving detected data 314 with a partial response target 318. The partial response target 318 can be predetermined or can be adapted in a target adaptation circuit 320 based on channel conditions and/or data being processed.

Control of the adaptation of the filter tap coefficients 330 for the DFIR 308 by the DFIR adaptation circuit 328 is performed based on detection of a particular pattern or patterns in the detected data 314, along with a determination of the quality of the data samples 306 from the analog to digital converter 304 corresponding to the samples in the detected data 314 with the detected pattern or patterns. In some embodiments, adaptation of the partial response target 318 in the target adaptation circuit 320 is also controlled based on detection of a particular pattern or patterns in the detected data 314, along with a determination of the quality of the data samples 306 from the analog to digital converter 304 corresponding to the samples in the detected data 314 with the detected pattern or patterns.

The pattern or patterns of concern can be programmed by a user, for example based on the performance and characteristics of the data processing channel, or can be predetermined. Similarly, the criteria used to determine the quality of the data samples 306 from the analog to digital converter 304 can be programmed by a user or can be predetermined.

A pattern detection circuit 332 monitors the detected data 314 for the pattern 334, generating a pattern detected signal 336 indicating that the pattern 334 has been found in the detected data 314. Again, the pattern 334 can be user-programmable or predetermined and made available in any suitable manner. The pattern 334 can have any number of bits. In some embodiments, as an example, the pattern 334 comprises a three-bit pattern q[n−1], q[n], q[n+1] containing 101 as part of a Nyquist pattern that may result in a higher than normal misdetection rate in the detector 312. Again, any other patterns with any number of bits can be specified, typically patterns for which the detector 312 is more likely to generate erroneous decisions that would lead to divergence when adapting the filter tap coefficients 330 and partial response target 318.

For data samples 306 for which the detector 312 has yielded the pattern 334 in the detected data 314, special care is taken by determining whether one or more of the data samples 306 corresponding to the pattern 334 have the expected values based on the decisions made by the detector 312. If the data samples 306 from the analog to digital converter 304 corresponding to the pattern 334 do not have the expected values, they are not used in adapting the filter tap coefficients 330 for the DFIR 308, and, in some embodiments, are not used in adapting the partial response target 318 in the target adaptation circuit 320. In other words, the DFIR adaptation circuit 328 and, in some cases, the target adaptation circuit 320, is disabled at least for data samples 306 corresponding to the pattern 334.

The quality determination for the data samples 306 is performed in an expected value comparison circuit 338, which examines data samples 306 according to an expected value criterion 340. In some embodiments, the expected value criterion 340 comprises a threshold, and the expected value comparison circuit 338 comprises a comparator that compares the absolute value of a data sample q[n] with the threshold. If the absolute value of a data sample q[n] in this case is less than the threshold, the data sample q[n] is identified as a high quality sample and the adaptation in the DFIR adaptation circuit 328 and target adaptation circuit 320 is continued using the data samples 306. If the absolute value of a data sample q[n] in this case is greater than the threshold, the data sample q[n] is identified as a low quality sample and the adaptation in the DFIR adaptation circuit 328 and target adaptation circuit 320 are disabled and at least the data samples 306 for which the detector 312 produced decisions 314 containing the pattern 334 are not used to adapt the filter tap coefficients 330 or the partial response target 318.

If a bit sequence 101 is written to a magnetic hard disk, and that data is read back from the magnetic hard disk with one or more read heads, the corresponding samples q[n−1], q[n], q[n+1] generated by the analog to digital converter 304 will each have some value within the range of output values for the analog to digital converter 304. The sample q[n] should have a value close to 0 due to the center 0 in the bit sequence, although it might also contain some components based on the neighboring 1's in the bit sequence, or based on data stored in adjacent tracks on the hard disk. The threshold in the expected value criterion 340 will be set at a level near 0 that distinguishes a sample for a 0 bit from samples for other values or from samples that have a large noise component. The expected value comparison circuit 338 will compare the absolute value of the sample q[n] with the threshold, and if the absolute value of the sample q[n] is below the threshold, then the sample q[n] has the correct or expected value for the center 0 in the bit sequence 101 that was written to the hard disk. If the absolute value of the sample q[n] is greater than the threshold, then the sample q[n] does not have the correct or expected value for the center 0 in the bit sequence 101 that was written to the hard disk. If the detector 312 yields decisions 314 containing the 101 pattern 334, the quality of the corresponding data samples 306 as determined by the expected value comparison circuit 338 is considered, and low quality samples for which the detector 312 yielded the pattern 334 are not used to adapt the filter tap coefficients 330 or partial response target 318, whereas high quality samples are used to adapt the filter tap coefficients 330 and partial response target 318.

The combination of the pattern detection and the expected value comparison can be combined in any suitable manner to control the adaptation process. For example, as depicted in FIG. 3, the pattern detection circuit 332 and expected value comparison circuit 338 can operate in parallel, generating the pattern detected signal 336 and quality indicator signal 342 that are combined in AND circuit 344, yielding an adaptation control signal 346 that enables or disables the DFIR adaptation circuit 328 and target adaptation circuit 320. In other embodiments, one test result can trigger the other test, for example, the quality determination by the expected value comparison circuit 338 can be triggered when the pattern 334 is found in the detected data 314 by the pattern detection circuit 332.

The data samples 306 and detected data 314 can be aligned in any suitable manner, enabling the expected value comparison circuit 338 to consider the data samples 306 from the analog to digital converter 304 corresponding to the detected data 314 in which the pattern 334 is found. For example, one or more memories or buffers can be provided, for example buffering the data samples 306 until the detector 312 has yielded the detected data 314 for the pattern detection circuit 332.

Adaptation disabling can be performed on a sample-by-sample basis, or can be performed for longer durations when the pattern 334 is detected in the detected data 314 and the corresponding data samples 306 from the analog to digital converter 304 do not have the expected values for the decisions made by the detector 312.

The adaptation can be disabled in any suitable manner. For example, the error signal 326 used by the DFIR adaptation circuit 328 can be zeroed out for low quality samples corresponding to detected data 314 in which the pattern 334 is detected. Such zeroing out can be performed, for example, by multiplying the error signal 326 by either a 0 or a 1 from a multiplexer (not shown), with the multiplexer outputting a 0 to disable the adaptation and a 1 to allow the adaptation to be performed. Again, any other method of disabling adaptation can be used. Based upon the disclosure provided herein, one of ordinary skill in the art will recognize a variety of methods for enabling and disabling adaptation of the filter tap coefficients 330 and the partial response target 318 that may be used in relation to different embodiments of the present invention. Furthermore, the adaptation by DFIR adaptation circuit 328 and target adaptation circuit 320 can be performed in any suitable manner, for example applying a least square fit in the DFIR adaptation circuit 328 to control the DFIR 308 so as to minimize or reduce the error signal 326. The number of bits (e.g., 3) in the partial response target 318, the number of filter tap coefficients 330 (e.g., 3), the number of bits (e.g., 3) in the pattern 334, etc. are not limited to any particular number.

The loop adaptation control disclosed herein can be applied to systems with a single data source or multiple data sources. For example, the loop adaptation control can be applied to a magnetic hard drive with a single read head or with an array reader with 2, 3, or any other number of read heads in the sensor array.

Turning to FIG. 4, an embodiment of DFIR adaptation control with pattern detection for multiple data sources such as the multiple read heads in an array reader is depicted in accordance with some embodiments of the present invention. Analog input signals 402, 462 are received by a data processing circuit 400 from multiple sources. In some cases, analog input signals 402, 462 are derived from a pair of sensors in an array reader on a read/write head assembly that is disposed in relation to a storage medium. Based upon the disclosure provided herein, one of ordinary skill in the art will recognize a variety of sources from which analog input signals 402, 462 may be derived. The analog input signals 402, 462 may have been processed in any suitable manner, for example by amplifying and/or filtering in a preamplifier and/or analog front ends before being received by the data processing circuit 400 of FIG. 4.

The analog input signals 402, 462 are sampled by analog to digital converters 404, 464 yielding data samples 406, 466. Analog to digital converters 404, 464 may be any circuit known in the art that are capable of producing digital samples corresponding to analog input signals. Based upon the disclosure provided herein, one of ordinary skill in the art will recognize a variety of analog to digital converter circuits that may be used in relation to different embodiments of the present inventions. Data samples 406, 466 are provided to digital finite impulse response (DFIR) filters 408, 468 which apply an equalization algorithm to data samples 406, 466, yielding equalized samples 410, 470. The DFIRs 408, 468 equalize data samples 406, 466 as configured by filter tap coefficients 430, 490, generated by DFIR adaptation circuits 428, 488. The DFIR adaptation circuits 428, 488 tailor the equalization applied by the DFIRs 408, 468 to the actual input data and signal to noise ratio conditions.

The equalized samples 410, 470 are provided to a combination circuit 450, yielding combined equalized samples 452. The combination circuit 450 combines the equalized samples 410, 470 in any suitable manner, such as, but not limited to, by averaging or any other algorithm. The combined equalized samples 452 are provided to a data detector 454, which applies an algorithm to equalized samples combined equalized samples 452 such as, but not limited to, a maximum likelihood algorithm to detect the original values of the data before storage or transmission, amplification and filtering, sampling and equalization. In some embodiments, the data detection algorithm can be but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention. Data detector 454 provides detected data 456, also referred to as hard decisions or non-return to zero (NRZ) data indicating the original input values as determined by the detector. Detected data 456 can be further processed or used in any suitable manner. In some embodiments, the detector 456 is a loop detector with relatively low latency performance, used to adjust and control feedback loops controlling analog filtering, DC offset cancellation, equalization, and/or other processes before the data values are further detected and decoded.

The DFIR adaptation circuits 428, 488 can adapt the filter tap coefficients 430, 490 for the DFIRs 408, 468 in any suitable manner. Based upon the disclosure provided herein, one of ordinary skill in the art will recognize a variety of DFIR adaptation algorithms and processes that may be used in relation to different embodiments of the present invention. In some embodiments, the DFIR adaptation circuits 428, 488 adapt the filter tap coefficients 430, 490 for the DFIRs 408, 468 based on an error signal 426, generated by subtracting Y ideal samples 422 from the combined equalized samples 452 or Y samples in subtraction circuit 424. Y ideal samples 422 can be generated in any suitable manner, such as, but not limited to, by convolving detected data 456 with a partial response target 418. The partial response target 418 can be predetermined or can be adapted in a target adaptation circuit (not shown) based on channel conditions and/or data being processed.

Control of the adaptation of the filter tap coefficients 430, 490 for the DFIRs 408, 468 by the DFIR adaptation circuits 428, 488 is performed based on detection of a particular pattern or patterns in the detected data 456, along with a determination of the quality of the data samples 406, 466 from the analog to digital converters 404, 464 corresponding to the samples in the detected data 456 with the detected pattern or patterns.

The pattern or patterns of concern can be programmed by a user, for example based on the performance and characteristics of the data processing channel, or can be predetermined. Similarly, the criteria used to determine the quality of the data samples 406, 466 from the analog to digital converters 404, 464 can be programmed by a user or can be predetermined.

A pattern detection circuit 432 monitors the detected data 456 for the pattern 434, generating a pattern detected signal 436 indicating that the pattern 434 has been found in the detected data 456. Again, the pattern 434 can be user-programmable or predetermined and made available in any suitable manner. The pattern 434 can have any number of bits. In some embodiments, as an example, the pattern 434 comprises a three-bit pattern q[n−1], q[n], q[n+1] containing [101] as part of a Nyquist pattern that may result in a higher than normal misdetection rate in the detector 412. Again, any other patterns with any number of bits can be specified, typically patterns for which the detector 454 is more likely to generate erroneous decisions that would lead to divergence when adapting the filter tap coefficients 430, 490.

For data samples 406, 466 for which the detector 454 has yielded the pattern 434 in the detected data 456, special care is taken by determining whether one or more of the data samples 406, 466 corresponding to the pattern 434 have the expected values based on the decisions made by the detector 454. If the data samples 406, 466 from the analog to digital converters 404, 464 corresponding to the pattern 434 do not have the expected values, they are not used in adapting the filter tap coefficients 430, 490 for the DFIRs 408, 468. In other words, the DFIR adaptation circuits 428, 488 are disabled at least for data samples 406, 466 corresponding to the pattern 434. Notably, in some embodiments the quality of each sample stream from each analog to digital converter 404, 464 is checked to control the adaptation separately for each data source.

The quality determination for the data samples 406 is performed in an expected value comparison circuit 438, which examines data samples 406 according to an expected value criterion 440. In some embodiments, the expected value criterion 440 comprises a threshold, and the expected value comparison circuit 438 comprises a comparator that compares the absolute value of a data sample q[n] with the threshold. If the absolute value of a data sample q[n] in this case is less than the threshold, the data sample q[n] is identified as a high quality sample and the adaptation in the DFIR adaptation circuit 428 is continued. If the absolute value of a data sample q[n] in this case is greater than the threshold, the data sample q[n] is identified as a low quality sample and the adaptation in the DFIR adaptation circuit 428 is disabled.

Similarly, the quality determination for the data samples 466 is performed in an expected value comparison circuit 466, which examines data samples 466 according to an expected value criterion 480. In some embodiments, the expected value criterion 480 comprises a threshold, and the expected value comparison circuit 478 comprises a comparator that compares the absolute value of a data sample q[n] with the threshold. If the absolute value of a data sample q[n] in this case is less than the threshold, the data sample q[n] is identified as a high quality sample and the adaptation in the DFIR adaptation circuit 488 is continued. If the absolute value of a data sample q[n] in this case is greater than the threshold, the data sample q[n] is identified as a low quality sample and the adaptation in the DFIR adaptation circuit 488 is disabled.

The combination of the pattern detection and the expected value comparison can be combined in any suitable manner to control the adaptation process. For example, as depicted in FIG. 4, the pattern detection circuit 432 and expected value comparison circuits 438, 478 can operate in parallel, generating the pattern detected signal 436 and quality indicator signals 442, 482 that are combined in AND circuits 444, 484, yielding adaptation control signals 446, 486 that enable or disable the DFIR adaptation circuits 428, 488. In other embodiments, one test result can trigger the other test, for example, the quality determination by the expected value comparison circuits 438, 478 can be triggered when the pattern 434 is found in the detected data 456 by the pattern detection circuit 432.

Turning now to FIG. 5, flow diagram 500 depicts a method for controlling adaptation of a digital finite impulse response filter with pattern detection in accordance with some embodiments of the present invention. Although the method depicted in FIG. 5 is adapted to a single data source, it can also be applied to multiple data sources. Following flow diagram 500, data samples are equalized in a digital finite impulse response filter to yield equalized data samples. (Block 502) A data detection algorithm is applied to the equalized data samples to yield detected data. (Block 504) The detected data is monitored for one or more patterns. (Block 506) If the pattern is detected (block 508), a determination is made as to whether the equalized data samples corresponding to the pattern in the detected data are close to expected sample values. (Block 510) If the pattern is not detected (block 508), the adaptation process is performed for the DFIR tap coefficients based on the samples corresponding to the pattern. (Block 516)

If the sample values are close to the expected sample values (block 512), the adaptation process is performed for the DFIR tap coefficients based on the samples corresponding to the pattern. (Block 516) As disclosed above, the comparison between data samples and the expected sample values can be performed in any suitable manner, such as, but not limited to, by comparing the absolute value of a sample with a threshold. If the sample values are not close to the expected sample values (block 512), e.g., if the absolute value of a sample q[n] is above a threshold, the adaptation of DFIR tap coefficients is disabled at least for the samples corresponding to the pattern. (Block 514)

In some embodiments, the loop adaptation control is used to disable DC loop adaptation. Such a DC loop can be used, for example, to remove a DC offset or bias in a signal path, either in an analog signal or in digital samples.

Turning now to FIG. 6, a data processing circuit 600 with DC loop adaptation control using pattern detection is depicted in accordance with some embodiments of the present invention. In some embodiments, the data processing system 600 includes an analog front end 604 that receives and processes an analog signal 602. Analog front end 604 may include, but is not limited to, a DC offset circuit that removes a DC offset in the analog signal 602 based on a feedback signal 644 from a DC loop 642. Analog front end 604 can also include an analog filter and an amplifier circuit as are known in the art. Based upon the disclosure provided herein, one of ordinary skill in the art will recognize a variety of circuitry that may be included as part of analog front end 604. Analog front end 604 receives and processes the analog signal 602, and provides a processed analog signal 606 to an analog to digital converter 608.

The processed analog input signal 606 is sampled by the analog to digital converter 608, yielding data samples 610. Analog to digital converter 608 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present inventions. Data samples 610 are provided to a digital low pass filter 612, yielding filtered samples 614. Filtered samples 614 are provided to a digital finite impulse response (DFIR) filter 616 which applies an equalization algorithm to filtered samples 614, yielding equalized samples 618. In some embodiments, DC offset cancellation is performed on the digital equalized samples 618 in combination circuit 620 based on a feedback signal 646 from the DC loop 642, yielding equalized samples 622.

The equalized samples 622 are provided to a data detector 624, which applies an algorithm to equalized samples 622 such as, but not limited to, a maximum likelihood algorithm to detect the original values of the data before storage or transmission, amplification and filtering, sampling and equalization. In some embodiments, the data detection algorithm can be but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention. Data detector 624 provides detected data 626, also referred to as hard decisions or non-return to zero (NRZ) data indicating the original input values as determined by the detector. Detected data 626 can be further processed or used in any suitable manner. In some embodiments, the detector 624 is a loop detector with relatively low latency performance, used to adjust and control feedback loops controlling analog filtering, DC offset cancellation, equalization, and/or other processes before the data values are further detected and decoded.

The DC loop 642 can generate the feedback signal(s) 644 and/or 646 in any suitable manner. In some embodiments, the DC loop 642 generates the feedback signal(s) 644 and/or 646 based on an error signal 640 generated by a DC accumulator 638. In some embodiments, the DC accumulator 638 can operate in one or more DC loop modes, accumulating groups of error values that have been scaled to control the rate at which the DC loop 642 responds to the error values. Based upon the disclosure provided herein, one of ordinary skill in the art will recognize a variety of DC loop algorithms and associated DC accumulator algorithms that may be used in relation to different embodiments of the present invention.

In some embodiments, the error signal 636 is generated by subtracting Y ideal samples 632 from equalized samples 622 or Y samples in a subtraction circuit 634, where the Y ideal samples 632 are generated by convolving the detected data 626 with a target 630 in a convolution circuit 628. In some other embodiments, the error signal 636 is generated by subtracting X ideal samples from X samples 610 or 614 from the analog to digital converter 608.

Control of the adaptation of the DC loop 642 is performed based on detection of a particular pattern or patterns in the detected data 626, along with a determination of the quality of the data samples 610 from the analog to digital converter 608 corresponding to the samples in the detected data 626 with the detected pattern or patterns.

The pattern or patterns of concern can be programmed by a user, for example based on the performance and characteristics of the data processing channel, or can be predetermined. Similarly, the criteria used to determine the quality of the data samples 610 from the analog to digital converter 608 can be programmed by a user or can be predetermined.

A pattern detection circuit 650 monitors the detected data 626 for the pattern 648, generating a pattern detected signal 652 indicating that the pattern 648 has been found in the detected data 626. Again, the pattern 648 can be user-programmable or predetermined and made available in any suitable manner. The pattern 648 can have any number of bits. In some embodiments, as an example, the pattern 648 comprises a three-bit pattern q[n−1], q[n], q[n+1] containing 101 as part of a Nyquist pattern that may result in a higher than normal misdetection rate in the detector 624. Again, any other patterns with any number of bits can be specified, typically patterns for which the detector 624 is more likely to generate erroneous decisions that would lead to divergence when adapting the DC loop 642.

For data samples 610 for which the detector 626 has yielded the pattern 648 in the detected data 626, special care is taken by determining whether one or more of the data samples 610 corresponding to the pattern 648 have the expected values based on the decisions made by the detector 626. If the data samples 610 from the analog to digital converter 608 corresponding to the pattern 648 do not have the expected values, they are not used in adapting the DC loop 642. In other words, the DC loop adaptation is disabled at least for data samples 610 corresponding to the pattern 648. The DC loop adaptation is accomplished in some embodiments by preventing input of the error signal 636 based on data samples 610 corresponding to the pattern 648 to the DC accumulator 638.

The quality determination for the data samples 610 is performed in an expected value comparison circuit 656, which examines data samples 610 according to an expected value criterion 654. In some embodiments, the expected value criterion 654 comprises a threshold, and the expected value comparison circuit 656 comprises a comparator that compares the sum of the absolute value of data samples q[n−1],q[n],q[n+1] with the threshold. In some embodiments, the number of samples for which the absolute values are summed and compared with the threshold is based on the number of taps in the target 630, such as, but not limited to, three taps and three data samples q[n−1],q[n],q[n+1]. If the sum of the absolute value of the data samples (e.g., q[n−1], q[n],q[n+1]) is greater than the threshold 654, the data samples (e.g., q[n−1],q[n],q[n+1]) are identified as low quality samples and the adaptation of the DC loop 642 is disabled. If the sum of the absolute value of the data samples is less than the threshold 654, the adaptation of the DC loop 642 continues based on the samples, for example providing the error signal 636 based on the samples to the DC accumulator 638.

The combination of the pattern detection and the expected value comparison can be combined in any suitable manner to control the adaptation process. For example, as depicted in FIG. 6, the pattern detection circuit 650 and expected value comparison circuit 656 can operate in parallel, generating the pattern detected signal 652 and quality indicator signal 658 that are combined in AND circuit 660, yielding an adaptation control signal 662 that enables or disables the DC loop adaptation. In other embodiments, one test result can trigger the other test, for example, the quality determination by the expected value comparison circuit 656 can be triggered when the pattern 648 is found in the detected data 626 by the pattern detection circuit 650.

The data samples 610 and detected data 626 can be aligned in any suitable manner, enabling the expected value comparison circuit 656 to consider the data samples 610 from the analog to digital converter 608 corresponding to the detected data 626 in which the pattern 648 is found. For example, one or more memories or buffers can be provided, for example buffering the data samples 610 until the detector 624 has yielded the detected data 626 for the pattern detection circuit 650.

The DC loop adaptation can be disabled in any suitable manner. For example, the error signal 636 provided to the DC accumulator 638 can be gated, for example, by multiplexer 664, passing a 0 value 668 to disable the DC loop adaptation or passing the error signal 636 to the DC accumulator 638 based on the adaptation control signal 662. Again, any other method of disabling adaptation can be used. Based upon the disclosure provided herein, one of ordinary skill in the art will recognize a variety of methods for enabling and disabling adaptation of the DC loop 642 that may be used in relation to different embodiments of the present invention.

The loop adaptation control disclosed herein can be applied to systems with a single data source or multiple data sources. For example, the loop adaptation control can be applied to a magnetic hard drive with a single read head or with an array reader with 2, 3, or any other number of read heads in the sensor array.

Figure 7:
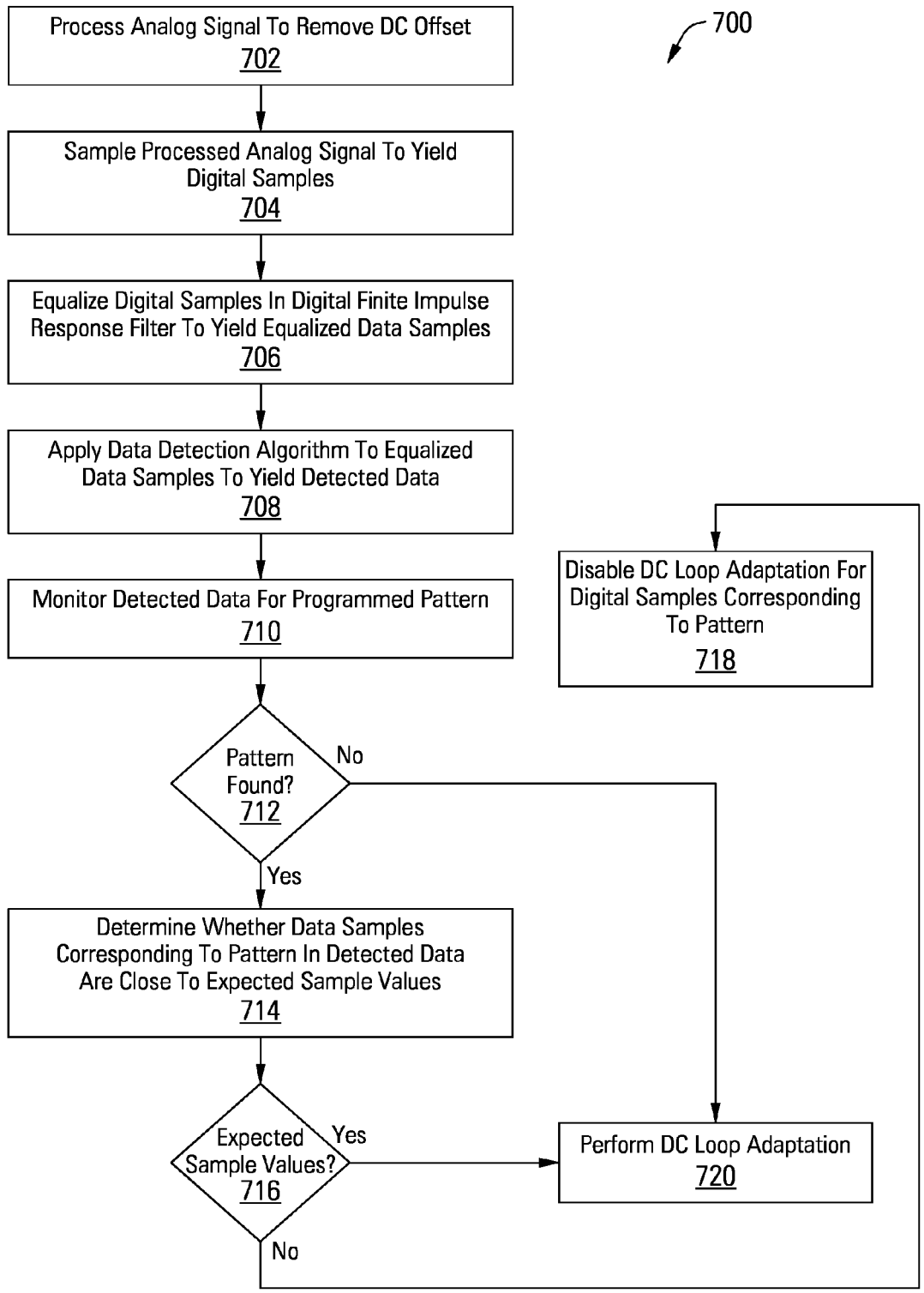
FIG. 7 depicts a flow diagram showing a method for controlling adaptation of a DC loop with pattern detection in accordance with some embodiments of the present invention.

Turning now to FIG. 7, flow diagram 700 depicts a method for controlling adaptation of a DC loop with pattern detection in accordance with some embodiments of the present invention. Although the method depicted in FIG. 7 is adapted to a single data source, it can also be applied to multiple data sources. Following flow diagram 700, an analog signal is processed to remove a DC offset. (Block 702) In some embodiments, the DC offset is removed from digital samples derived from the analog signal, either in place of or in combination with the DC offset removal from the analog signal. The processed analog signal is sampled to yield digital samples. (Block 704) The digital samples are equalized in a digital finite impulse response filter to yield equalized data samples. (Block 706) A data detection algorithm is applied to the equalized data samples to yield detected data. (Block 708) The detected data is monitored for a pattern or patterns. (Block 710) If the pattern is not found (block 712), the DC loop adaptation proceeds based on the samples corresponding to the detected data. (Block 720) If the pattern is found (block 712), a determination is made as to whether the data samples corresponding to the pattern in the detected data are close to the expected sample values. (Block 714) In some embodiments, this determination is made by comparing the sum of the absolute value of the data samples corresponding to the pattern with a threshold. If the sum is greater than the threshold, the samples are considered in some embodiments and for some patterns to have poor quality, and if the sum is less than the threshold, the samples are considered in some embodiments and for some patterns to have good quality. Thus, if the data samples are close to the expected values (block 716), the DC loop adaptation proceeds based on the samples corresponding to the detected data. (Block 720) If the data samples are not close to the expected values (block 716), the DC loop adaptation is disabled for the digital samples corresponding to the detected pattern. (Block 718)

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some cases, parts of a given system, block or circuit may be implemented in software or firmware, while other parts are implemented in hardware.

In conclusion, the present invention provides novel apparatuses and methods for controlling loop adaptation with pattern detection. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. An apparatus for controlling a feedback loop, comprising:
   a digital finite impulse response filter configured to equalize digital samples to yield equalized data;
   a data detector circuit configured to detect values of the equalized data to yield detected data;
   a pattern detection circuit configured to detect at least one pattern in the detected data;

an expected value comparison circuit configured to compare the digital samples corresponding to the at least one pattern with an expected value; and a feedback loop adaptation circuit configured to control a feedback loop based in part on whether the at least one pattern is detected by the pattern detection circuit and on an output of the expected value comparison circuit.

2. The apparatus of claim 1, wherein the feedback loop adaptation circuit is configured to adapt tap coefficients for the digital finite impulse response filter.

3. The apparatus of claim 1, wherein the expected value comparison circuit comprises a comparator configured to compare an absolute value of the digital samples corresponding to the at least one pattern with a threshold.

4. The apparatus of claim 3, wherein the feedback loop adaptation circuit is disabled when the at least one pattern is detected and the absolute value of the digital samples corresponding to the at least one pattern is greater than the threshold.

5. The apparatus of claim 1, further comprising an analog front end circuit configured to process an analog signal, and an analog to digital converter configured to sample an output of the analog front end circuit, wherein the feedback loop adaptation circuit is configured to control DC offset cancellation in the analog front end circuit.

6. The apparatus of claim 5, wherein the expected value comparison circuit comprises a comparator configured to compare a sum of an absolute value of the digital samples corresponding to the at least one pattern with a threshold.

7. The apparatus of claim 6, wherein the feedback loop adaptation circuit is disabled when the at least one pattern is detected and the sum is greater than the threshold.

8. The apparatus of claim 7, further comprising a multiplexer configured to provide an error signal to a DC accumulator to enable DC loop adaptation and to block the error signal from the DC accumulator to disable DC loop adaptation.

9. The apparatus of claim 1, wherein the feedback loop adaptation circuit is configured to control adaptation of a partial response target.

10. The apparatus of claim 1, further comprising a second digital Finite impulse response filter configured to equalize second digital samples from a different source than the digital samples, wherein the digital samples and the second digital samples represent the same data, further comprising a second expected value comparison circuit configured to compare the second digital samples corresponding to the at least one pattern with a second expected value, further comprising a second feedback loop adaptation circuit configured to control a second feedback loop based in part on whether the at least one pattern is detected by the pattern detection circuit and on an output of the second expected value comparison circuit.

11. The apparatus of claim 1, wherein the pattern is programmable.

12. The apparatus of claim 1, wherein a criterion applied by the expected value comparison circuit is programmable.

13. A method of controlling a feedback loop, comprising:
controlling a DC offset in an analog signal;
sampling the analog signal to yield digital samples;
equalizing the digital samples in a digital finite impulse response filter to yield equalized data;
detecting data values in the equalized data to yield detected data;
determining whether the detected data comprises a data pattern;
determining a difference between the digital samples corresponding to the data pattern and expected values of the digital samples for the data pattern; and
disabling adaptation of a feedback loop based at least in part on whether the detected data comprises the data pattern and on the difference between the digital samples corresponding to the data pattern and the expected values.

14. The method of claim 13, wherein disabling adaptation of the feedback loop comprises discontinuing adaptation of tap coefficients for the digital finite impulse response filter.

15. The method of claim 13, wherein disabling adaptation of the feedback loop comprises discontinuing accumulation of error values used to control the DC offset in the analog signal.

16. The method of claim 13, further comprising comparing a sum of an absolute value of the digital samples corresponding to the data pattern with a threshold.

17. The method of claim 16, wherein the adaptation of the feedback loop is disabled when the detected data comprises the data pattern and the absolute value of the digital samples corresponding to the data pattern is greater than the threshold.

18. The method of claim 13, further comprising disabling adaptation of a partial response target based at least in part on whether the detected data comprises the data pattern and on the difference between the digital samples corresponding to the data pattern and the expected values.

19. The method of claim 13, further comprising sampling a second analog signal to yield second digital samples;
equalizing the second digital samples in a second digital finite impulse response filter to yield second equalized data;
combining the equalized data and the second equalized data, wherein said detecting data values is performed on the combined equalized data and the second equalized data;
determining a difference between the second digital samples corresponding to the data pattern and expected values of the second digital samples for the data pattern; and
disabling adaptation of a second feedback loop based at least in part on whether the detected data comprises the data pattern and on the difference between the second digital samples corresponding to the data pattern and the expected values.

* * * * *